United States Patent
Fujita

(10) Patent No.: US 10,427,671 B2
(45) Date of Patent: Oct. 1, 2019

(54) VEHICLE STABILITY CONTROL DEVICE

(71) Applicant: TOYOTA JIDOSHA KABUSHIKI KAISHA, Toyota-shi, Aichi-ken (JP)

(72) Inventor: Yoshitaka Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 15/681,560

(22) Filed: Aug. 21, 2017

(65) Prior Publication Data

US 2018/0111607 A1     Apr. 26, 2018

(30) Foreign Application Priority Data

Oct. 20, 2016   (JP) ................. 2016-205791

(51) Int. Cl.
*B60W 30/045*     (2012.01)
*B60W 30/18*      (2012.01)
(Continued)

(52) U.S. Cl.
CPC ....... *B60W 30/045* (2013.01); *B60G 17/0165* (2013.01); *B60G 17/0195* (2013.01);
(Continued)

(58) Field of Classification Search
CPC .... B60W 30/045; B60W 10/18; B60W 10/20; B60W 10/22; B60W 2510/22; B60W 2710/22; B60W 2520/14; B60W 2520/18; B60W 2510/18; B60W 2510/20; B60W 2710/18; B60W 40/114; B60W 40/072; B60W 40/064; B60W 30/18172; B60W 2040/1307; B60T 8/00; B60T 7/12; B60T 8/1764; B60T 8/1755; B60T 2260/06; B60T 2201/16; B60G 21/0555; B60G 17/0165;
(Continued)

(56) References Cited

U.S. PATENT DOCUMENTS 6,183,052 B1 *   2/2001   Harada et al. ........ B60T 8/1755
                                                     303/147
6,663,113 B2 *  12/2003   Schulke et al. .... B60G 17/0165
                                                     280/5.505

(Continued)

FOREIGN PATENT DOCUMENTS

| JP | 2000-127733 A | 5/2000 |
| JP | 2010-195089 A | 9/2010 |
| JP | 2010-215068 A | 9/2010 |

*Primary Examiner* — Dale W Hilgendorf
(74) *Attorney, Agent, or Firm* — Oliff PLC

(57) ABSTRACT

A vehicle stability control device has: a front active stabilizer installed on a front wheel side; a rear active stabilizer installed on a rear wheel side; a turning device for turning the front and rear wheels; and a control device configured to perform load distribution control in conjunction with turning control that actuates the turning device, when a difference in braking force between left and right sides of the vehicle exceeds a threshold value during braking. A first side is one of the left and right sides with a greater braking force, and a second side is the other of the left and right sides. In the load distribution control, the control device actuates the rear active stabilizer in a direction to lift up the first side and actuates the front active stabilizer in a direction to lift up the second side.

3 Claims, 11 Drawing Sheets

(51) Int. Cl.

| | | |
|---|---|---|
| *B60W 40/072* | (2012.01) | |
| *B60W 40/064* | (2012.01) | |
| *B60W 40/114* | (2012.01) | |
| *B60G 17/0195* | (2006.01) | |
| *B60T 8/1755* | (2006.01) | |
| *B60W 10/18* | (2012.01) | |
| *B60W 10/20* | (2006.01) | |
| *B60W 10/22* | (2006.01) | |
| *B60T 8/1764* | (2006.01) | |
| *B60G 17/0165* | (2006.01) | |
| *B60G 21/055* | (2006.01) | |
| *B60T 7/12* | (2006.01) | |
| *B60T 8/00* | (2006.01) | |
| *B60W 40/13* | (2012.01) | |

(52) U.S. Cl.
CPC ............ *B60G 21/0555* (2013.01); *B60T 7/12* (2013.01); *B60T 8/00* (2013.01); *B60T 8/1755* (2013.01); *B60T 8/1764* (2013.01); *B60W 10/18* (2013.01); *B60W 10/20* (2013.01); *B60W 10/22* (2013.01); *B60W 30/18172* (2013.01); *B60W 40/064* (2013.01); *B60W 40/072* (2013.01); *B60W 40/114* (2013.01); *B60G 2400/0523* (2013.01); *B60G 2400/104* (2013.01); *B60G 2400/204* (2013.01); *B60G 2400/208* (2013.01); *B60G 2400/41* (2013.01); *B60G 2400/822* (2013.01); *B60T 2201/16* (2013.01); *B60T 2260/06* (2013.01); *B60W 2040/1307* (2013.01); *B60W 2510/18* (2013.01); *B60W 2510/20* (2013.01); *B60W 2510/22* (2013.01); *B60W 2520/14* (2013.01); *B60W 2520/18* (2013.01); *B60W 2710/18* (2013.01); *B60W 2710/22* (2013.01)

(58) Field of Classification Search
CPC ........ B60G 17/0195; B60G 2400/0523; B60G 2400/822

See application file for complete search history.

(56) References Cited

U.S. PATENT DOCUMENTS 7,431,309 B2 \* 10/2008 Kobayashi ......... B60G 17/0152
  280/6.159
2002/0109309 A1   8/2002 Schulke et al.

\* cited by examiner

VEHICLE STABILITY CONTROL DEVICE

BACKGROUND

Technical Field

The present invention relates to a vehicle stability control device that controls a vehicle attitude when there is a difference in braking force between left and right wheels.

Background Art

When braking is performed in a vehicle traveling on a split-μ road, a yaw moment is generated in the vehicle due to a difference in braking force between left and right wheels. Patent Literature 1 discloses a technique that detects such the yaw moment and performs turning control to counteract the detected yaw moment. More specifically, Patent Literature 1 discloses a steering control device that is capable of turning not only a front wheel but also a rear wheel of the vehicle. In order to counteract the detected yaw moment mentioned above, the steering control device turns a high-μ side rear wheel in a toe-out direction and turns a low-μ side rear wheel in a toe-in direction.

Patent Literature 2 also discloses a vehicle that is capable of turning a front wheel and a rear wheel. When the vehicle corners, a rolling behavior is suppressed in order to prevent the turned rear wheel from coming in contact with a sprung mass member.

LIST OF RELATED ART

Patent Literature 1: JP-2010-195089
Patent Literature 2: JP-2010-215068

SUMMARY

According to the technique disclosed in Patent Literature 1, the turning control is performed in order to counteract the yaw moment caused by the difference in braking force between left and right wheels. By performing such the turning control, the vehicle attitude is expected to be stabilized. However, during braking, load shifts forward and thus a vertical load on the rear wheel decreases. As a result, a friction ellipse regarding the rear wheel shrinks and thus a margin available for a lateral force is reduced. This tendency becomes more prominent as deceleration increases. If a sufficient lateral force of the rear wheel is not obtained, the yaw moment caused by the difference in braking force between left and right wheels cannot be counteracted as expected. In other words, the turning control for vehicle stabilization cannot fully exert its effect.

An object of the present invention is to provide a technique that can secure a greater lateral force when there is a difference in braking force between left and right wheels.

A first embodiment provides a vehicle stability control device. The vehicle stability control device includes:
a front active stabilizer installed on a side of a front wheel of a vehicle;
a rear active stabilizer installed on a side of a rear wheel of the vehicle;
a turning device configured to turn the front wheel and the rear wheel; and
a control device configured to perform load distribution control in conjunction with turning control that actuates the turning device, when a difference in braking force between a left side and a right side of the vehicle exceeds a threshold value during braking.

A first side is one of the left side and the right side with a greater braking force, and a second side is another of the left side and the right side.

In the load distribution control, the control device actuates the rear active stabilizer in a direction to lift up the first side and actuates the front active stabilizer in a direction to lift up the second side.

A second embodiment further has the following features in addition to the first embodiment.

The control device performs the load distribution control such that a roll moment caused by actuation of the rear active stabilizer and a roll moment caused by actuation of the front active stabilizer are balanced.

A third embodiment further has the following features in addition to the first or second embodiment.

In the turning control, the control device turns the front wheel and the rear wheel in directions to counteract a yaw moment caused by the difference in the braking force.

A fourth embodiment further has the following features in addition to any one of the first to third embodiments.

The control device is configured to further perform anti-lock brake control that prevents a target wheel from locking up.

The anti-lock brake control includes:
pressure decrease control that decreases a brake fluid pressure for the target wheel; and
pressure increase control that increases the brake fluid pressure after the pressure decrease control.

When a condition that the load distribution control is in execution and the target wheel is the rear wheel on the first side or the front wheel on the second side is satisfied, the control device performs the pressure increase control such that the brake fluid pressure increases faster than in a case where the condition is not satisfied.

According to the first embodiment, when the difference in braking force between the left side and the right side of the vehicle exceeds the threshold value, the load distribution control is performed in conjunction with the turning control. Although a vertical load on the rear wheel decreases when braking is performed, the load distribution control makes it possible to increase the vertical load on the rear wheel on the first side that greatly contributes to the braking force and the lateral force. As a result, with regard to the rear wheel on the first side, the friction ellipse becomes larger and the margin available for the lateral force expands. It is therefore possible to generate a sufficient lateral force in the rear wheel on the first side, even when the deceleration increases. That is to say, it is possible to effectively perform the turning control, even when the deceleration increases.

According to the second embodiment, a roll angle does not change by the load distribution control, which is preferable in terms of stabilization of the vehicle attitude and reduction in a driver's feeling of strangeness.

According to the third embodiment, the yaw moment is suppressed and thus the vehicle stability improves.

According to the fourth embodiment, a great braking force is obtained at an earlier stage and thus deceleration performance improves.

EMBODIMENTS

Embodiments of the present invention will be described below with reference to the attached drawings.

1. Outline 1-1. Turning Control

Figure 1:
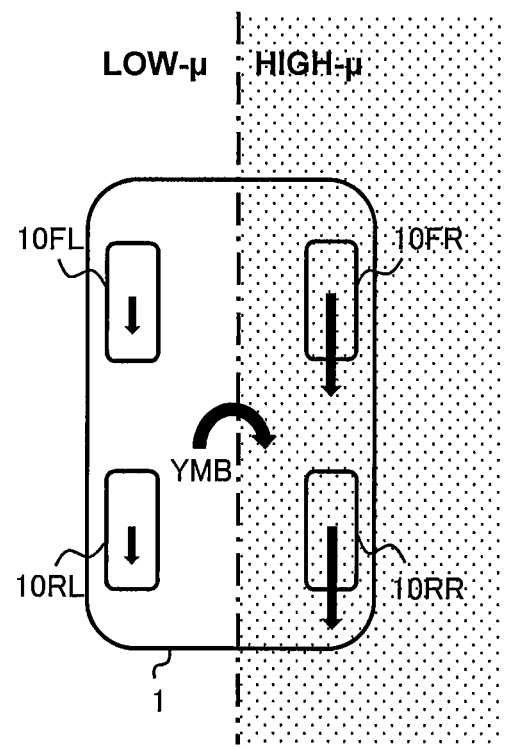
FIG. 1 is a conceptual diagram for explaining an example where a difference in braking force between left and right wheels occurs.

FIG. 1 is a conceptual diagram for explaining an example where a difference in braking force between left and right wheels occurs in a vehicle 1. The vehicle 1 is provided with a left front wheel 10FL, a right front wheel 10FR, a left rear wheel 10RL, and a right rear wheel 10RR. In the following description, the left front wheel 10FL and the right front wheel 10FR may be collectively referred to as a "front wheel", and the left rear wheel 10RL and the right rear wheel 10RR may be collectively referred to as a "rear wheel". The left front wheel 10FL and the left rear wheel 10RL may be collectively referred to as a "left wheel", and the right front wheel 10FR and the right rear wheel 10RR may be collectively referred to as a "right wheel".

In FIG. 1, the vehicle 1 is traveling on a split-μ road. On the split-μ road, a coefficient of static friction (μ) is different between the left wheel side and the right wheel side. In the example shown in FIG. 1, the left wheel side is a low-μ side, and the right wheel side is a high-μ side. In the following description, the left front wheel 10FL and the left rear wheel 10RL may be collectively referred to as a "low-μ side wheel", and the right front wheel 10FR and the right rear wheel 10RR may be collectively referred to as a "high-μ side wheel".

Let us consider a case where braking is performed when the vehicle 1 is traveling on the split-μ road. In this case, the low-μ side wheel is more likely to slip than the high-μ side wheel, and a braking force of the low-μ side wheel is smaller than a braking force of the high-μ side wheel. Conversely, the braking force of the high-μ side wheel is greater than the braking force of the low-μ side wheel. That is, a difference in braking force between the left and right wheels occurs. Such the difference in braking force between the left and right wheels causes a yaw moment YMB that turns the vehicle 1 in the high-μ side direction. Such the yaw moment YMB is not preferable in terms of vehicle stability. Therefore, the vehicle 1 performs turning control in order to counteract the yaw moment YMB.

Figure 2:
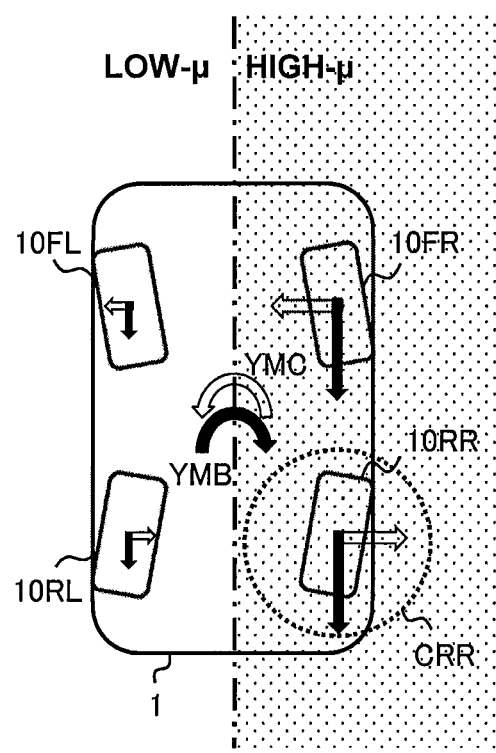
FIG. 2 is a conceptual diagram for explaining turning control for counteracting a yaw moment caused by the difference in braking force between left and right wheels.

FIG. 2 is a conceptual diagram for explaining the turning control for counteracting the yaw moment YMB. In order to counteract the yaw moment YMB, it is effective to turn the front wheel and the rear wheel such that a counter yaw moment YMC as shown in FIG. 2 is generated. Therefore, when detecting that the difference in braking force between the left and right wheels exceeds a threshold value, the vehicle 1 calculates the yaw moment YMB expected from the difference in braking force between the left and right wheels. Then, the vehicle 1 calculates, based on the expected yaw moment YMB, target steering angles of the front wheel and the rear wheel for generating the counter yaw moment YMC and performs the turning control. As a result, the vehicle yaw moment as a whole is suppressed and thus the vehicle attitude is stabilized.

It should be noted that a friction ellipse regarding the low-μ side wheel is small and there is no margin to generate a sufficient lateral force in addition to the braking force. Therefore, it is necessary to generate most of the counter yaw moment YMC by the high-μ side wheel. In other words, it is necessary to secure a sufficient lateral force in the high-μ side wheel.

Moreover, the inventor of this application focused on load transfer during braking. That is, during braking, load shifts forward and thus a vertical load on the rear wheel decreases. As a result, a friction ellipse CRR (see FIG. 2) regarding the right rear wheel 10RR on the high-μ side shrinks and thus a margin available for a lateral force is reduced. This tendency becomes more prominent as deceleration increases. The reason is that as the deceleration increases, the load transfer amount increases and thus the friction ellipse CRR becomes even smaller, and at the same time, the margin of the friction ellipse CRR is further consumed by increase in the braking force.

When the margin available for the lateral force is reduced in the right rear wheel 10RR on the high-μ side, it becomes difficult in the right rear wheel 10RR to generate the lateral force required for achieving the counter yaw moment YMC. That is to say, it becomes difficult to counteract, as expected, the yaw moment YMB caused by the difference in braking force between the left and right wheels, which is not preferable in terms of the vehicle stability.

In this manner, the effect of the turning control for the vehicle stabilization becomes weaker as the deceleration increases. It is difficult to sufficiently secure both the vehicle stability and braking performance by merely performing the simple turning control as shown in FIG. 2. Therefore, it is desirable to enlarge the margin available for the lateral force in the right rear wheel 10RR on the high-μ side, namely, the friction ellipse of the right rear wheel 10RR as much as possible.

Figure 3:
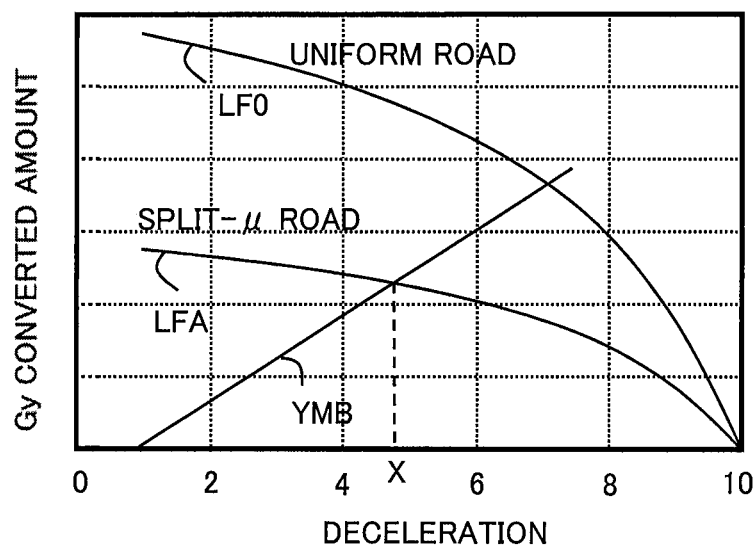
FIG. 3 is a graph showing a relationship between a lateral force margin and the yaw moment caused by the difference in braking force between left and right wheels.

FIG. 3 is a graph showing the above-described perspective in a summarized manner. A relationship between the yaw moment YMB and a lateral force margin is shown in FIG. 3. Here, the lateral force margin means the margin (maximum value) available for the lateral force. A vertical axis represents each of the yaw moment YMB and the lateral force margin in a form of a value converted into a lateral acceleration (Gy). On the other hand, a horizontal axis represents the deceleration.

Curves LF0 and LFA in FIG. 3 represent the lateral force margins in cases of a uniform road and the split-μ road, respectively. For simplicity's sake, only the lateral force margin of the rear wheel (10RL, 10RR) is considered. In the case of the split-μ road (i.e. the curve LFA), there is little lateral force margin on the low-μ side, and thus the lateral force margin is originally smaller than in the case of the uniform road (i.e. the curve LF0). In addition to that, the lateral force margin becomes even smaller as the deceleration increases, as described above.

On the other hand, the yaw moment YMB increases as the deceleration increases. The reason is that as the deceleration increases, the braking force of the high-μ side wheel becomes greater and thus the difference in braking force between the left and right wheels becomes larger. As shown in FIG. 3, the lateral force corresponding to the yaw moment YMB can be secured in a range where the deceleration is X or less. However, if the deceleration exceeds X, the lateral force corresponding to the yaw moment YMB cannot be secured.

From a viewpoint of balancing the vehicle stability and the braking performance, it is desirable to enlarge the range in which the lateral force corresponding to the yaw moment YMB can be secured. To that end, it is desirable to move the curve LFA shown in FIG. 3 upward. That is, it is desirable to enlarge the lateral force margin (i.e. the friction ellipse) of the right rear wheel 10RR on the high-μ, side. According to the present embodiment, in order to enlarge the lateral force margin of the right rear wheel 10RR on the high-μ side, "load distribution control" as described below is performed.

1-2. Load Distribution Control

Figure 4:
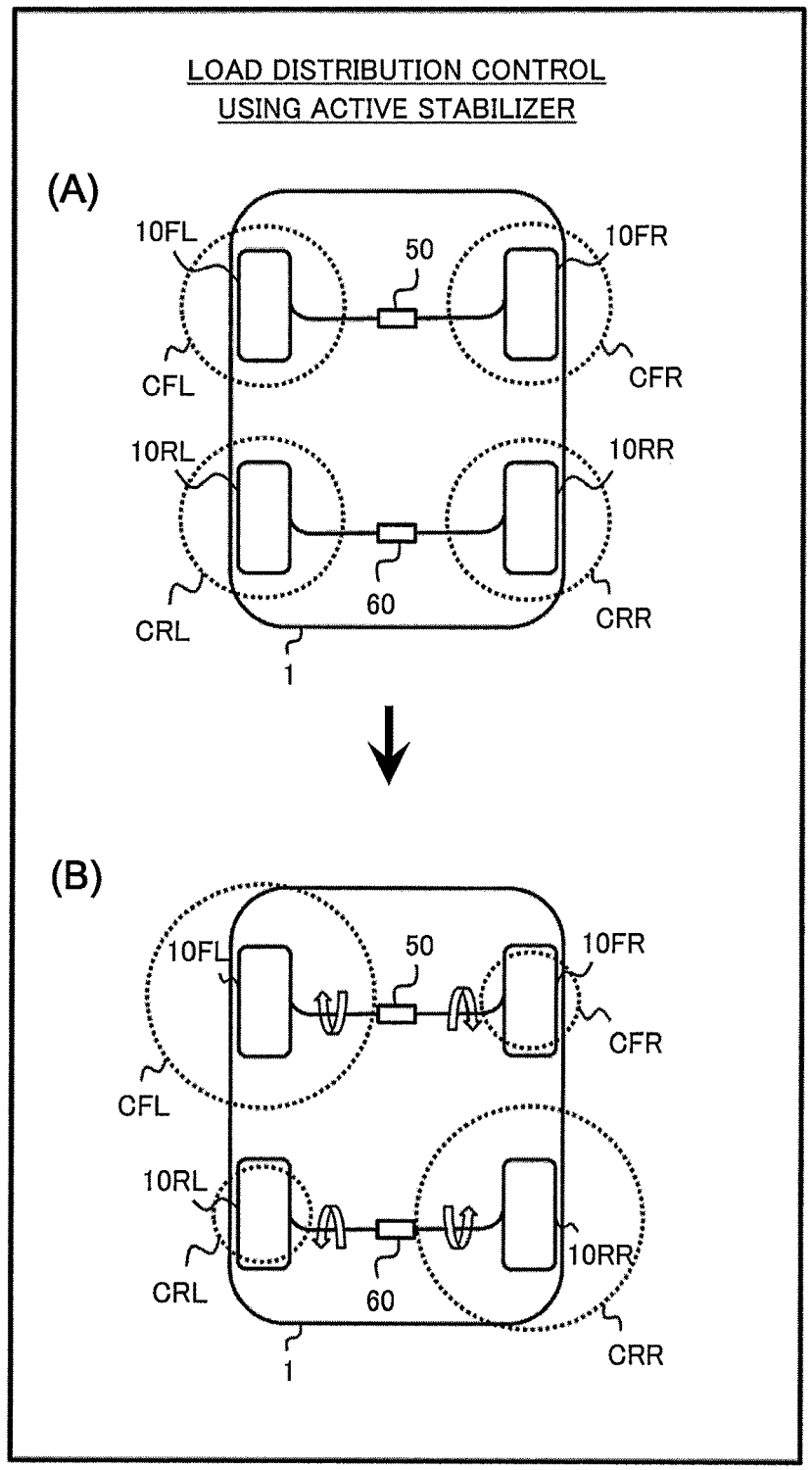
FIG. 4 is a conceptual diagram for explaining load distribution control according to an embodiment of the present invention.

FIG. 4 is a conceptual diagram for explaining the load distribution control according the present embodiment. In the present embodiment, the load distribution control is performed by the use of an active stabilizer. The active stabilizer can actively twist a stabilizer bar by using an actuator (electric motor), and thereby can control a roll angle of the vehicle 1. As shown in FIG. 4, the vehicle 1 according to the present embodiment is provided with both a front active stabilizer 50 and a rear active stabilizer 60. The front active stabilizer 50 is installed on the front wheel side of the vehicle 1. On the other hand, the rear active stabilizer 60 is installed on the rear wheel side of the vehicle 1.

STATE (A) in FIG. 4 indicates a state before the load distribution control is performed. For simplicity, let us consider a case where load is equally applied to the left front wheel 10FL, the right front wheel 10FR, the left rear wheel 10RL, and the right rear wheel 10RR in STATE (A). Friction ellipses CFL, CFR, CRL, and CRR with regard to the left front wheel 10FL, the right front wheel 10FR, the left rear wheel 10RL, and the right rear wheel 10RR, respectively, are also conceptually shown.

STATE (B) in FIG. 4 indicates a state during the load distribution control. In STATE (B), the front active stabilizer 50 is actuated in a direction to lift up the side of the left front wheel 10FL (i.e. the low-μ side) and pull down the side of the right front wheel 10FR (i.e. the high-μ, side). At the same time, the rear active stabilizer 60 is actuated in a direction to pull down the side of the left rear wheel 10RL (i.e. the low-μ side) and lift up the side of the right rear wheel 10RR (i.e. the high-μ side). That is to say, the front active stabilizer 50 and the rear active stabilizer 60 are actuated in the opposite directions (opposite phases).

When the actuation directions of the front active stabilizer 50 and the rear active stabilizer 60 are opposite to each other, a direction of a roll moment caused by the actuation of the front active stabilizer 50 and a direction of a roll moment caused by the actuation of the rear active stabilizer 60 also are opposite to each other. When the roll moment caused by the actuation of the front active stabilizer 50 and the roll moment caused by the actuation of the rear active stabilizer 60 are completely balanced, the roll angle of the vehicle 1 does not change.

Figure 5:
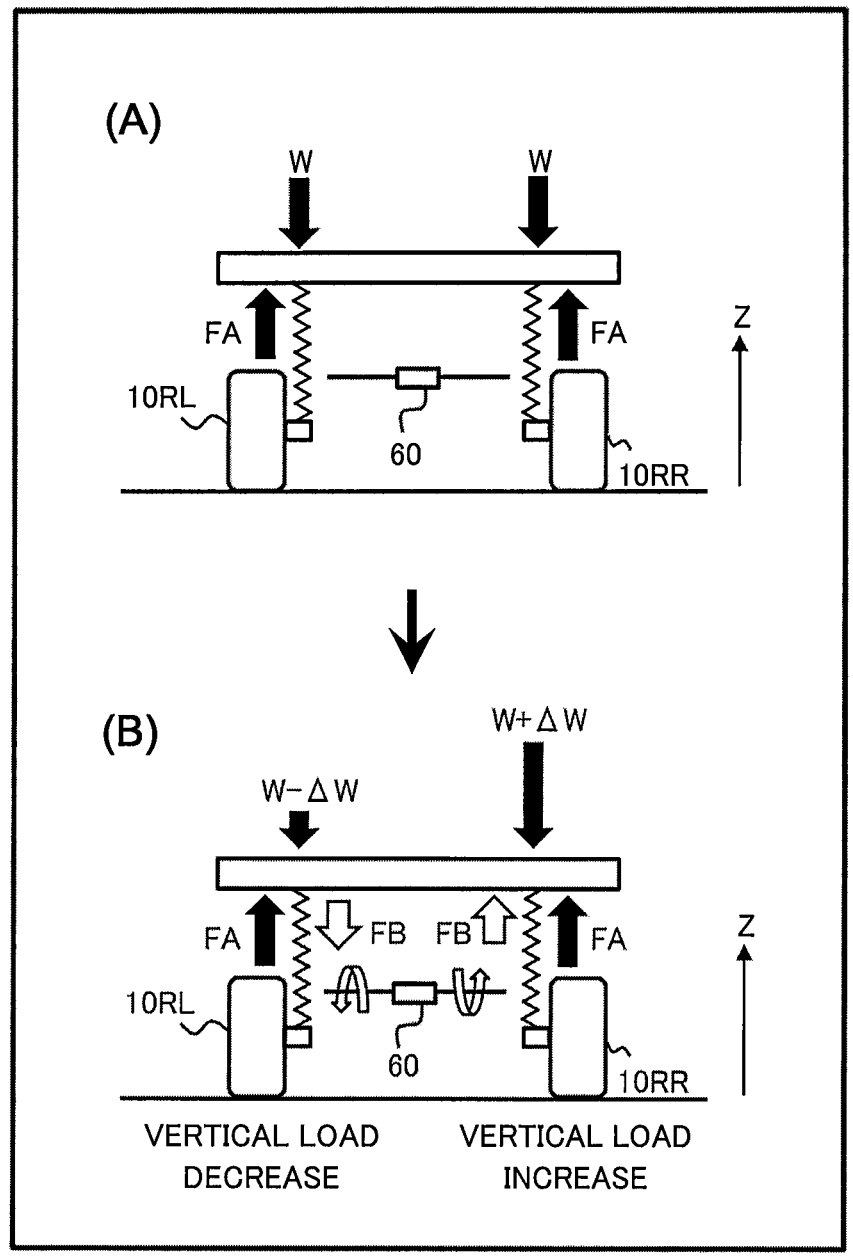
FIG. 5 is a conceptual diagram for explaining the load distribution control according to the embodiment of the present invention.

FIG. 5 conceptually illustrates change in the vertical load on the rear wheels (10RL, 10RR) due to the load distribution control. Here, let us consider a case where the roll moment caused by the actuation of the front active stabilizer 50 and the roll moment caused by the actuation of the rear active stabilizer 60 are completely balanced and thus the roll angle does not change.

In STATE (A) before the load distribution control is performed, load W of a sprung mass is applied to each of the side of the left rear wheel 10RL and the side of the right rear wheel 10RR. The rear active stabilizer 60 is not actuated, and the rear active stabilizer 60 does not apply any force to the vehicle body. A suspension is contracted according to the load W, and a repulsive force FA is generated in +Z-direction (upward). That is, the load W and the repulsive force FA are balanced.

In STATE (B) during the load distribution control, the rear active stabilizer 60 applies a force FB in a direction (i.e. +Z-direction) to lift up the vehicle body on the side of the right rear wheel 10RR. Meanwhile, since the roll angle has not changed, the repulsive force FA has not changed either since STATE (A). As a result, a force of "FA+FB" in the +Z-direction acts on the vehicle body on the side of the right rear wheel 10RR. The load balancing with the force "FA+FB" is "W+ΔW". That is to say, the load is increased by the amount of the force FB as compared with STATE (A).

The increase ΔW in the load is due to the fact that the front active stabilizer 50 applies the force in a direction to lift up the side of the left front wheel 10FL on the diagonal. That is, the force lifting up the side of the left front wheel 10FL acts in a direction to push down the side of the right rear wheel 10RR, which appears as the increase ΔW in the load. In other words, as a result of the balance between the forces lifting up the side of the left front wheel 10FL and the side of the right rear wheel 10RR on the diagonal, the load is increased with the roll angle remaining unchanged.

Similarly, in STATE (B) during the load distribution control, the rear active stabilizer 60 applies a force FB in a direction (i.e. −Z-direction) to pull down the vehicle body on the side of the left rear wheel 10RL. Meanwhile, since the roll angle has not changed, the repulsive force FA has not changed either since STATE (A). As a result, a force of "FA−FB" in the +Z-direction acts on the vehicle body on the side of the left rear wheel 10RL. The load balancing with the force "FA−FB" is "W−ΔW". That is to say, the load is decreased by the amount of the force FB as compared with STATE (A).

The decrease ΔW in the load is due to the fact that the front active stabilizer 50 applies the force in a direction to pull down the side of the right front wheel 10FR on the diagonal. That is, the force pulling down the side of the right front wheel 10FR acts in a direction to pull up the side of the left rear wheel 10RL, which appears as the decrease ΔW in the load. In other words, as a result of the balance between the forces pulling down the side of the right front wheel 10FR and the side of the left rear wheel 10RL on the diagonal, the load is decreased with the roll angle remaining unchanged.

As described above, in the load distribution control according to the present embodiment, the front active stabilizer 50 and the rear active stabilizer 60 are actuated in the opposite directions. As a result, the vertical loads on the right rear wheel 10RR and the left front wheel 10FL increase, while the vertical loads on the left rear wheel 10RL and the right front wheel 10FR decrease. Therefore, as shown in STATE (B) in FIG. 4, the respective friction ellipses CRR and CFL of the right rear wheel 10RR and the left front wheel 10FL expand, while the respective friction ellipses CRL and CFR of the left rear wheel 10RL and the right front wheel 10FR shrink.

Figure 6:
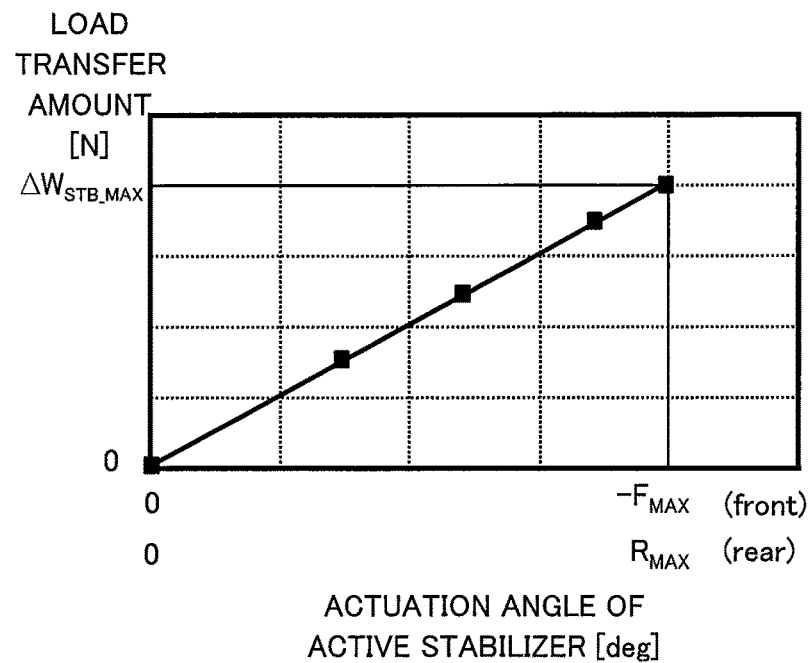
FIG. 6 is a graph showing load transfer amount achieved by the load distribution control according to the embodiment of the present invention.

FIG. 6 is a graph showing load transfer amount achieved by the load distribution control according to the present embodiment. A vertical axis represents the load transfer amount. A horizontal axis represents respective actuation angles (i.e. twist angles) of the front active stabilizer 50 and the rear active stabilizer 60. A sign being different between the respective actuation angles $-D_{MAX}$ and $R_{MAX}$ means that the front active stabilizer 50 and the rear active stabilizer 60 are actuated in the opposite directions. An absolute value of the actuation angle varies depending on a thickness of the stabilizer bar. As can be seen from FIG. 6, the load distribution control according to the present embodiment enables the load transfer of $\Delta W_{STB\_MAX}$ [N] at the maximum. It was confirmed that the maximum load transfer amount $\Delta W_{STB\_MAX}$ is sufficient for the load distribution control.

It should be noted that, in the load distribution control, it is not absolutely necessary to completely balance the roll moment caused by the actuation of the front active stabilizer 50 and the roll moment caused by the actuation of the rear active stabilizer 60. Even when the both roll moments are not balanced, the vertical load on the right rear wheel 10RR increases to some extent. The important thing is to actuate the front active stabilizer 50 and the rear active stabilizer 60 in the opposite directions (opposite phases) such that the vertical load on the right rear wheel 10RR increases.

When the both roll moments are completely balanced, the roll angle does not change, which is preferable in terms of stabilization of the vehicle attitude and reduction in a driver's feeling of strangeness.

1-3. Combination of Turning Control and Load Distribution Control

According to the present embodiment, the load distribution control (see FIGS. 4 and 5) is performed in combination with the turning control (see FIG. 2). That is, when detecting that the difference in braking force between the left and right wheels exceeds the threshold value, the vehicle 1 performs the load distribution control in conjunction with the turning control. Due to the load distribution control, the vertical load on the right rear wheel 10RR on the high-μ side increases and thus the friction ellipse CRR becomes larger. This means that the lateral force margin of the right rear wheel 10RR on the high-μ, side expands. It is therefore possible to generate a sufficient lateral force in the right rear wheel 10RR, even when the deceleration increases. That is to say, it is possible to effectively perform the turning control for the vehicle stabilization, even when the deceleration increases. In other words, it is possible to sufficiently secure both the vehicle stability and the braking performance.

Figure 7:
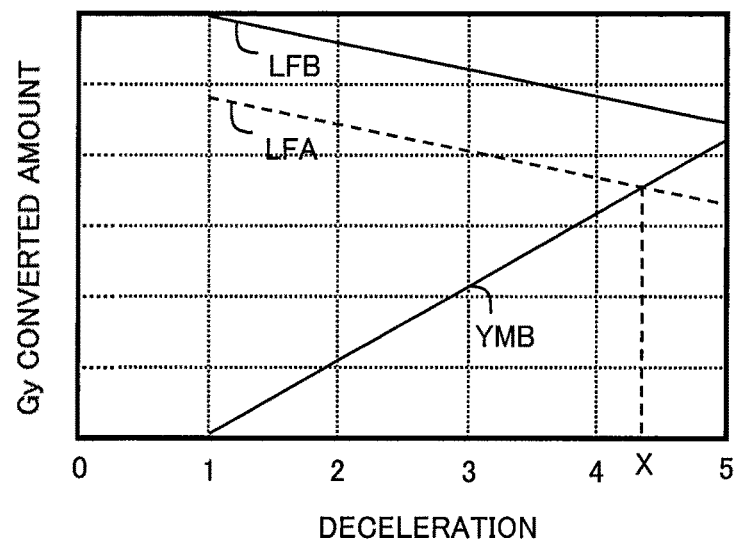
FIG. 7 is a graph for explaining an effect of the embodiment of the present invention.

FIG. 7 is a graph for explaining the effect by the present embodiment, the format of which is the same as in the foregoing FIG. 3. Due to the load distribution control according to the present embodiment, the lateral force margin increases from LFA to LFB. As a result, the range in which the lateral force corresponding to the yaw moment YMB can be secured expands. That is, even when the deceleration increases, the lateral force enough for counteracting the yaw moment YMB is likely to be secured. It is thus possible sufficiently secure both the vehicle stability and the braking performance.

Hereinafter, a concrete configuration example for realizing the present embodiment will be described.

2. Configuration Example

Figure 8:
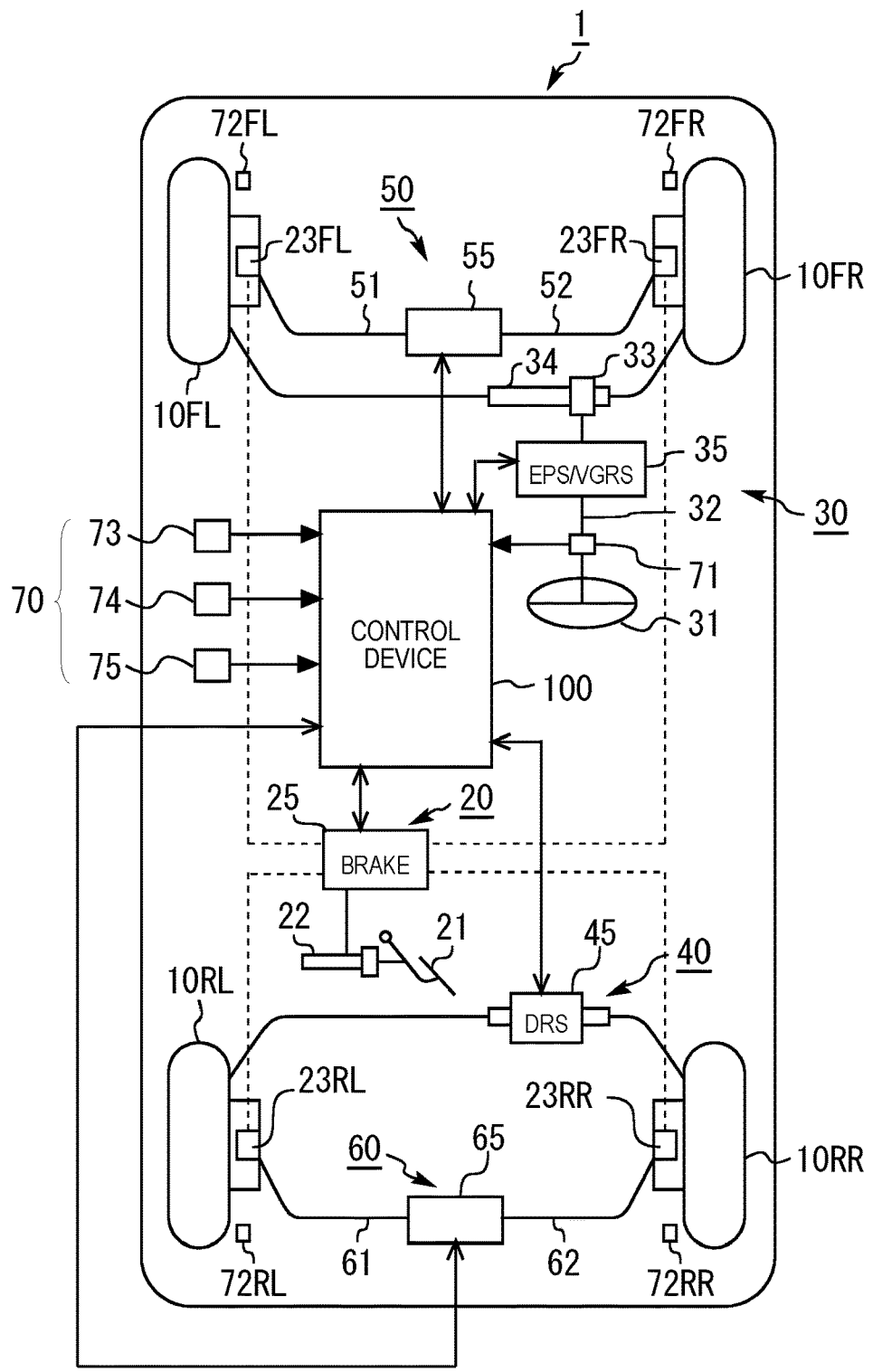
FIG. 8 is a block diagram showing a configuration example of a vehicle stability control device according to the embodiment of the present invention.

FIG. 8 is a block diagram showing a configuration example of a vehicle stability control device according to the present embodiment. The vehicle stability control device is mounted on the vehicle 1. The vehicle stability control device is provided with a braking device 20, a front wheel turning device 30, a rear wheel turning device 40, the front active stabilizer 50, the rear active stabilizer 60, a sensor group 70, and a control device 100.

2-1. Braking Device

The braking device 20 is a device for generating the braking force. The braking device 20 includes a brake pedal 21, a master cylinder 22, wheel cylinders 23FL, 23FR, 23RL, and 23RR, and a brake actuator 25.

The brake pedal 21 is an operating member used by a driver for performing a braking operation. The master cylinder 22 is connected to the wheel cylinders 23FL, 23FR, 23RL, and 23RR through the brake actuator 25. The wheel cylinders 23FL, 23FR, 23RL, and 23RR are provided for the left front wheel 10FL, the right front wheel 10FR, the left rear wheel 10RL, and the right rear wheel 10RR, respectively.

The master cylinder 22 supplies a brake fluid of a pressure corresponding to an operating amount of the brake pedal 21 by the driver to the brake actuator 25. The brake actuator 25 distributes the brake fluid output from the master cylinder 22 to the wheel cylinders 23FL, 23FR, 23RL, and 23RR. Braking forces at the left front wheel 10FL, the right front wheel 10FR, the left rear wheel 10RL, and the right rear wheel 10RR are respectively determined depending on pressures of the brake fluids supplied to the wheel cylinders 23FL, 23FR, 23RL, and 23RR.

Here, the brake actuator 25, which includes valves and pumps, is able to individually adjust the respective pressures of the brake fluids supplied to the wheel cylinder 23FL, 23FR, 23RL, and 23RR. That is, the brake actuator 25 is able to individually adjust the respective braking forces of the left front wheel 10FL, the right front wheel 10FR, the left rear wheel 10RL, and the right rear wheel 10RR. The operation of the brake actuator 25 is controlled by the control device 100. The control device 100 is able to actuate the brake actuator 25 to control the braking forces, independently of the braking operation by the driver.

2-2. Turning Device

The turning device is a device for turning the front wheel and the rear wheel. More specifically, the turning device includes the front wheel turning device 30 and the rear wheel turning device 40.

The front wheel turning device 30 is a device for turning the front wheel (10FL, 10FR). The front wheel turning device 30 includes a steering wheel 31, a steering shaft 32, a pinion gear 33, a rack bar 34, and a front wheel turning actuator 35.

The steering wheel 31 is an operating member used by the driver for performing a steering operation. One end of the steering shaft 32 is connected to the steering wheel 31, and the other end thereof is connected to the pinion gear 33. The pinion gear 33 engages with the rack bar 34. Both ends of the rack bar 34 are respectively connected to the left and right front wheels. A rotation of the steering wheel 31 is transmitted to the pinion gear 33 through the steering shaft 32. A rotational motion of the pinion gear 33 is converted into a linear motion of the rack bar 34, and thereby the steering angle of the front wheel changes.

The front wheel turning actuator 35 includes at least one of an EPS (Electronic Power Steering) actuator and a VGRS (Variable Gear Ratio Steering) actuator.

The EPS actuator is a device for generating a steering torque to assist turning of the front wheel. The EPS actuator includes an electric motor and generates the steering torque by a rotation of the electric motor. The EPS actuator applies the steering torque to the pinion gear 33, for example. A rotating operation of the electric motor of the EPS actuator is controlled by the control device 100.

The VGRS actuator is a device for changing a ratio of a steering angle of the steering wheel 31 and a steering angle of the front wheel. The VGRS actuator is provided between an upper part and a lower part of the steering shaft 32. The VGRS actuator includes an electric motor and rotates the electric motor to change a ratio of a rotation angle of the upper part and a rotation angle of the lower part of the steering shaft 32. Thereby, it is possible to variably control the ratio of the steering angle of the steering wheel 31 and the steering angle of the front wheel. A rotating operation of the electric motor of the VGRS actuator also is controlled by the control device 100.

By using the EPS actuator or the VGRS actuator thus configured, it is possible to turn the front wheel independently of the steering operation by the driver.

The rear wheel turning device 40 is a device for turning the rear wheel (10RL, 10RR). The rear wheel turning device 40 includes a rear wheel turning actuator 45. The rear wheel turning actuator 45 is a DRS (Dynamic Rear Steering) actuator.

The DRS actuator includes a turning bar, a ball screw, and an electric motor. Both ends of the turning bar are respectively connected to the left and right rear wheels. The ball screw is provided between the turning bar and the electric motor. When the electric motor rotates, the ball screw converts the rotational motion into a linear motion of the turning bar, and thereby a steering angle of the rear wheel changes. A rotating operation of the electric motor of the DRS actuator also is controlled by the control device 100. By using the DRS actuator thus configured, it is possible to turn the rear wheel independently of the steering operation by the driver.

2-3. Active Stabilizer

The front active stabilizer 50 is installed on the front wheel side of the vehicle 1. The front active stabilizer 50 includes stabilizer bars 51 and 52, and a stabilizer actuator 55. The stabilizer bar 51 is connected through a link rod to a suspension arm provided for the left front wheel 10FL. The stabilizer bar 52 is connected through a link rod to a suspension arm provided for the right front wheel 10FR.

The stabilizer actuator 55 includes an electric motor. One of the stabilizer bars 51 and 52 is connected so as to rotate integrally with a stator of the electric motor. The other of the stabilizer bars 51 and 52 is connected to a rotor of the electric motor. By rotating the electric motor, it is possible to twist the stabilizer bars 51 and 52 in opposite directions. A rotating operation of the electric motor also is controlled by the control device 100. The control device 100 is able to actively control the roll angle of the vehicle 1 by actuating the front active stabilizer 50.

The rear active stabilizer 60 is installed on the rear wheel side of the vehicle 1. The rear active stabilizer 60 includes stabilizer bars 61 and 62, and a stabilizer actuator 65. The stabilizer bar 61 is connected through a link rod to a suspension arm provided for the left rear wheel 10RL. The stabilizer bar 62 is connected through a link rod to a suspension arm provided for the right rear wheel 10RR.

The stabilizer actuator 65 includes an electric motor. One of the stabilizer bars 61 and 62 is connected so as to rotate integrally with a stator of the electric motor. The other of the stabilizer bars 61 and 62 is connected to a rotor of the electric motor. By rotating the electric motor, it is possible to twist the stabilizer bars 61 and 62 in opposite directions. A rotating operation of the electric motor also is controlled by the control device 100. The control device 100 is able to actively control the roll angle of the vehicle 1 by actuating the rear active stabilizer 60.

2-4. Sensor Group

The sensor group 70 is provided for detecting a variety of state quantities of the vehicle 1. For example, the sensor group 70 includes a steering angle sensor 71, wheel speed sensors 72FL, 72FR, 72RL, and 72RR, a vehicle speed sensor 73, a yaw rate sensor 74, and a lateral acceleration sensor 75.

The steering angle sensor 71 detects a steering wheel angle that is the steering angle of the steering wheel 31. The steering angle sensor 71 outputs detected information indicating the detected steering wheel angle to the control device 100.

The wheel speed sensors 72FL, 72FR, 72RL, and 72RR are provided for the wheels 10FL, 10FR, 10RL, and 10RR, respectively. The wheel speed sensors 72FL, 72FR, 72RL, and 72RR respectively detect rotational speeds of the wheels 10FL, 10FR, 10RL, and 10RR, and output detected information indicating the detected rotational speeds to the control device 100.

The vehicle speed sensor 73 detects a vehicle speed that is a speed of the vehicle 1. The vehicle speed sensor 73 outputs detected information indicating the detected vehicle speed to the control device 100.

The yaw rate sensor 74 detects an actual yaw rate of the vehicle 1. The yaw rate sensor 74 outputs detected information indicating the detected actual yaw rate to the control device 100.

The lateral acceleration sensor 75 detects an actual lateral acceleration acting on the vehicle 1. The lateral acceleration sensor 75 outputs detected information indicating the detected actual lateral acceleration to the control device 100.

2-5. Control Device

The control device 100 is a controller that performs vehicle stability control according to the present embodiment. Typically, the control device 100 is a microcomputer including a processor, a memory, and an input/output interface. The control device 100 is also called an ECU (Electronic Control Unit). The control device 100 receives the detected information from the sensor group 70 and sends instructions to a variety of actuators (25, 35, 45, 55, 65) through the input/output interface.

Hereinafter, functions and processing flow of the control device 100 according to the present embodiment will be described in more detail.

3. Functions and Processing Flow of Control Device

Figure 9:
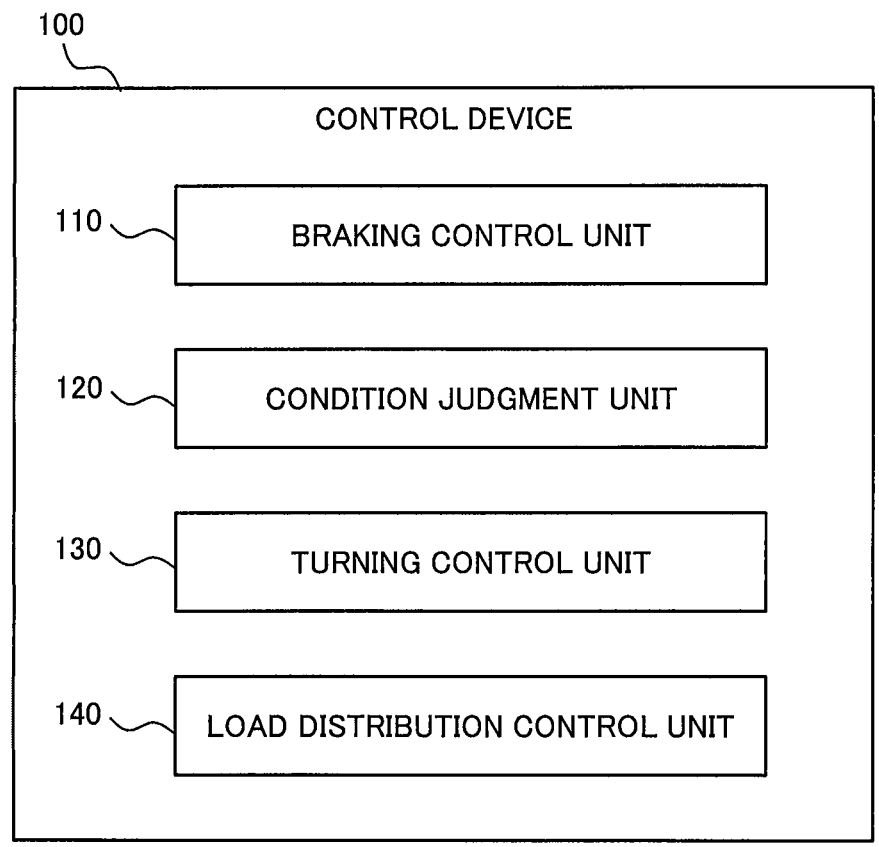
FIG. 9 is a block diagram showing a functional configuration of a control device of the vehicle stability control device according to the embodiment of the present invention.

FIG. 9 is a block diagram showing a functional configuration of the control device 100 according to the present embodiment. The control device 100 includes, as functional blocks, a braking control unit 110, a condition judgment unit 120, a turning control unit 130, and a load distribution control unit 140. These functional blocks are achieved by the processor of the control device 100 executing a control program stored in the memory. The control program may be recorded on a computer-readable recording medium.

3-1. Braking Control Processing

The braking control unit 110 performs braking control processing. For example, the braking control unit 110 generates the braking force in response to an operation of the brake pedal 21 by the driver. In this case, the braking control unit 110 calculates a target braking force according to the operating amount of the brake pedal 21 and controls the brake actuator 25 so as to achieve the target braking force.

Moreover, the braking control unit 110 performs anti-lock brake control (so called, ABS (Antilock Braking System) control) that prevents a wheel from locking up. More specifically, the braking control unit 110 detects a wheel exhibiting "locking-up sign". A wheel exhibiting the locking-up sign means that a slip amount or a slip ratio of the wheel exceeds a threshold value. The braking control unit 110 can calculate the slip amount and the slip ratio of the wheel based on a rotational speed of the wheel and a vehicle speed. Respective rotational speeds of the wheels are detected by the wheel speed sensors 72FL, 72FR, 72RL, and 72RR. The vehicle speed is detected by the vehicle speed sensor 73. Alternatively, the vehicle speed may be calculated from the respective rotational speeds of the wheels. Based on the detected information, the braking control unit 110 determines whether or not any wheel exhibits the locking-up sign. A wheel exhibiting the locking-up sign is a "target wheel" being a target of the anti-lock brake control. In order to prevent the target wheel from locking up, the braking control unit 110 controls the brake actuator 25 to reduce the brake fluid pressure for the target wheel.

The braking device 20 and the braking control unit 110 of the control device 100 constitute a "braking control means" for performing the braking control processing.

3-2. Condition Judgment Processing

The condition judgment unit 120 judges whether or not to perform the turning control (see FIG. 2) and the load distribution control (see FIGS. 4 and 5) according to the present embodiment. A trigger condition for performing the controls is that "a difference in braking force between the left and right wheels exceeds a threshold value Th". That is, the condition judgment unit 120 performs condition judgment processing that judges whether or not the trigger condition is satisfied.

The difference in braking force between the left and right wheels corresponds to a difference between the brake fluid pressure for the left wheel and the brake fluid pressure for the right wheel. Each brake fluid pressure is obtained by a pressure sensor included in the brake actuator 25. Based on the brake fluid pressures, the condition judgment unit 120 is able to judge whether or not the difference in braking force between the left and right wheels exceeds the threshold value Th. For example, the threshold value Th is set to the difference in braking force corresponding to a yaw rate of about 6 to 8 [deg/sec].

It should be noted that the difference in braking force between the left and right wheels is typically caused by braking on the split-μ road as shown in FIG. 1. It can be said that the condition judgment unit 120 detects whether or not braking is performed on the split-μ road.

The braking device 20 and the condition judgment unit 120 of the control device 100 constitute a "condition judgment means" for performing the condition judgment processing.

3-3. Turning Control Processing

In response to the satisfaction of the trigger condition described above, the turning control unit 130 performs the turning control (see FIG. 2) according to the present embodiment. In the turning control, the turning control unit 130 turns the front wheel and the rear wheel in directions to counteract the yaw moment YMB caused by the difference in braking force between the left and right wheels.

Target steering angles of the front wheel and the rear wheel are determined based on the difference in braking force between the left and right wheels. For example, the turning control unit 130 holds a steering angle map that defines a relationship between an input parameter and the target steering angles. As the input parameter, (a) the difference in braking force between the left and right wheels, (b) the yaw moment YMB expected from the difference in braking force between the left and right wheels, and the like are exemplified. As the value of the input parameter increases, the target steering angles increase accordingly. The turning control unit 130 uses the input parameter and the steering angle map to obtain the target steering angles of the front wheel and the rear wheel.

Then, based on the target steering angle of the front wheel and the steering wheel angle, the turning control unit 130 actuates the front wheel turning device 30 (i.e. the front wheel turning actuator 35) to perform the turning control of the front wheel such that the target steering angle is achieved. The steering wheel angle is detected by the steering angle sensor 71. Moreover, based on the target steering angle of the rear wheel, the turning control unit 130 actuates the rear wheel turning device 40 (i.e. the rear wheel turning actuator 45) to perform the turning control of the rear wheel such that the target steering angle is achieved.

The front wheel turning device 30, the rear wheel turning device 40, and the turning control unit 130 of the control device 100 constitute a "turning control means" for performing the turning control processing.

3-4. Load Distribution Control Processing

In response to the satisfaction of the trigger condition described above, the load distribution control unit 140 performs the load distribution control (see FIGS. 4 and 5) according to the present embodiment. As described above, the trigger condition is that "the difference in braking force between the left and right wheels exceeds the threshold value Th". In the following description, one of the left side and the right side with a greater braking force is referred to as a "first side", and the other with a smaller braking force is referred to as a "second side". In the case of the split-μ road, the first side is the high-μ side, and the second side is the low-μ side.

In the load distribution control, the load distribution control unit 140 actuates the front active stabilizer 50 and the rear active stabilizer 60 in the opposite directions such that the vertical load on the rear wheel on the first side increases. More specifically, the load distribution control unit 140 actuates the front active stabilizer 50 (i.e. the stabilizer actuator 55) in a direction to pull down the first side (i.e. the high-μ side) and lift up the second side (i.e. the low-μ side). At the same time, the load distribution control unit 140 actuates the rear active stabilizer 60 (i.e. the stabilizer actuator 65) in a direction to lift up the first side (i.e. the high-μ side) and pull down the second side (i.e. the low-μ side).

Target twist angles (target actuation angles) of the front active stabilizer 50 and the rear active stabilizer 60 are determined based on the difference in braking force between the left and right wheels. For example, the load distribution control unit 140 holds a twist angle map that defines a relationship between an input parameter and the target twist angles. As the input parameter, (a) the difference in braking force between the left and right wheels, (b) the yaw moment YMB expected from the difference in braking force between the left and right wheels, (c) the target steering angles calculated in the above-described turning control processing, and the like are exemplified. As the value of the input parameter increases, the target twist angles increase accordingly. The load distribution control unit 140 uses the input parameter and the twist angle map to obtain the target twist angles of the front active stabilizer 50 and the rear active stabilizer 60. Then, based on the obtained target twist angles, the load distribution control unit 140 actuates the front active stabilizer 50 and the rear active stabilizer 60 to perform the load distribution control.

The load distribution control may be performed such that the roll moment caused by the actuation of the front active stabilizer 50 and the roll moment caused by the actuation of the rear active stabilizer 60 are completely balanced. In this case, the roll angle does not change by the load distribution control, which is preferable in terms of stabilization of the vehicle attitude and reduction in a driver's feeling of strangeness.

The front active stabilizer 50, the rear active stabilizer 60, and the load distribution control unit 140 of the control device 100 constitute a "load distribution control means" for performing the load distribution control processing.

3-5. Processing Flow

Figure 10:
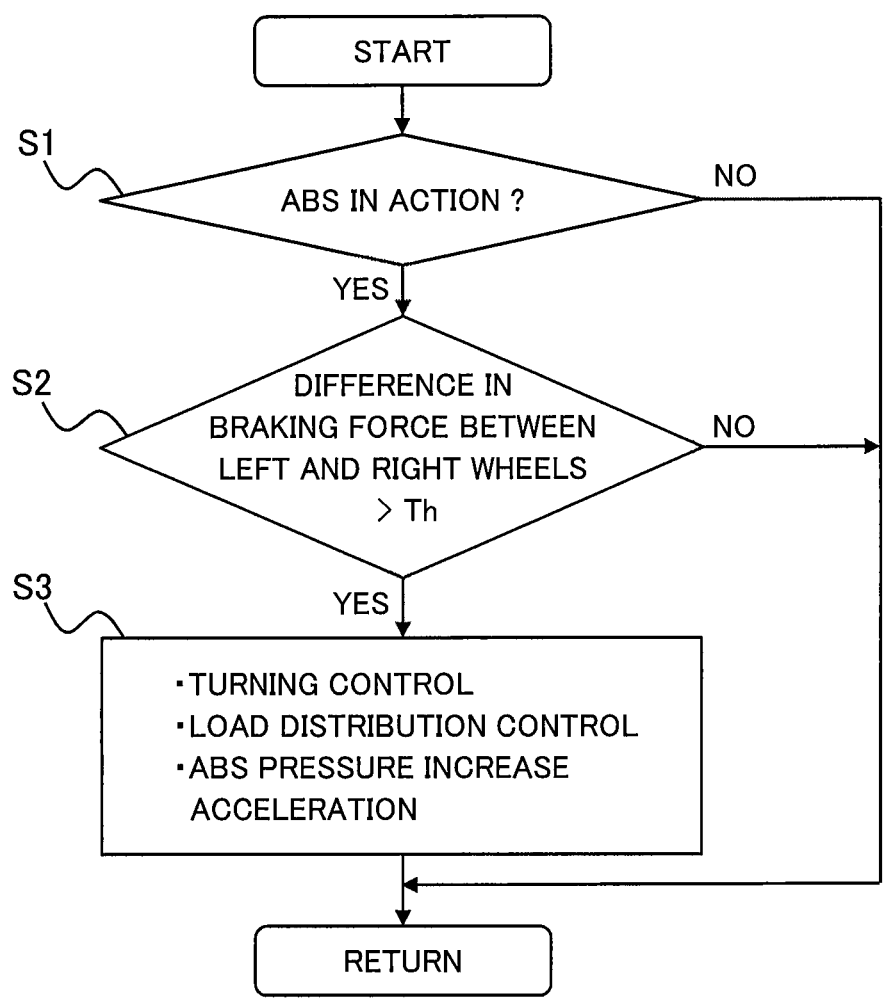
FIG. 10 is a flow chart showing in a summarized manner processing by the vehicle stability control device according to the embodiment of the present invention.

FIG. 10 is a flow chart showing in a summarized manner processing by the vehicle stability control device according to the present embodiment. The control device 100 repeatedly executes the processing flow shown in FIG. 10.

Step S1:

The braking control means performs the braking control processing. Here, the braking control means determines whether or not the anti-lock brake control (the ABS control) described above is in action. If the anti-lock brake control is being performed with respect to at least one wheel (Step S1; Yes), then the processing proceeds to Step S2. Otherwise (Step S1; No), the current processing cycle ends.

Step S2:

The condition judgment means performs the condition judgment processing. More specifically, the condition judgment means judges whether or not the trigger condition that "the difference in braking force between the left and right wheels exceeds the threshold value Th" is satisfied. If the trigger condition is satisfied (Step S2; Yes), then the processing proceeds to Step S3. If the trigger condition is not satisfied (Step S2; No), then the current processing cycle ends.

Step S3:

The turning control means performs the turning control processing. More specifically, the turning control means turns the front wheel and the rear wheel in directions to counteract the yaw moment YMB caused by the difference in braking force between the left and right wheels.

Moreover, the load distribution control means performs the load distribution control processing. More specifically, the load distribution control means actuates the front active stabilizer 50 and the rear active stabilizer 60 in the opposite directions such that the vertical load on the rear wheel on the first side (i.e. the high-μ side) increases.

Figure 11:
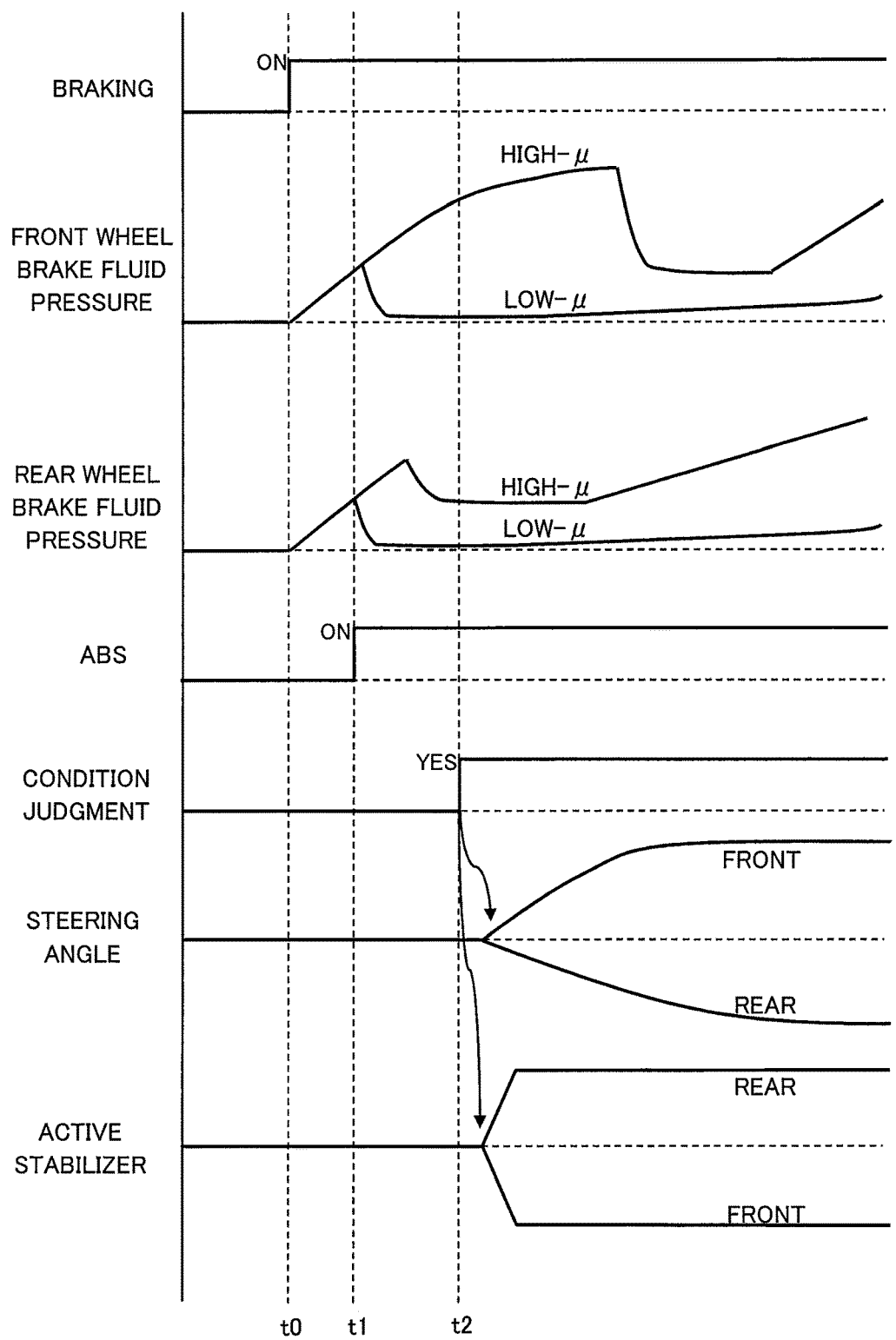
FIG. 11 is a timing chart showing an example of the processing by the vehicle stability control device according to the embodiment of the present invention.

FIG. 11 is a timing chart showing an example of the processing according to the present embodiment. At a time t0, braking is started. For example, the driver operates the brake pedal 21. The braking control means increases the brake fluid pressure for each wheel to generate the braking force.

At a time t1, the slip amount of the left rear wheel 10RL exceeds a threshold value. That is, the left rear wheel 10RL exhibits the locking-up sign. Therefore, the braking control means starts the anti-lock brake control with respect to the left rear wheel 10RL as the target wheel (Step S1; Yes). The braking control means reduces the brake fluid pressure for the left rear wheel 10RL. After that, the right rear wheel 10RR whose friction ellipse CRR has shrunk due to deceleration also exhibits the locking-up sign. The braking control means starts the anti-lock brake control with respect to the right rear wheel 10RR as the target wheel.

At a time t2, the difference in braking force between the left and right wheels exceeds the threshold value Th (Step S2; Yes). That is, the trigger condition is satisfied. In response to the satisfaction of the trigger condition, the turning control means turns the front wheel and the rear wheel (Step S3). Moreover, in response to the satisfaction of the trigger condition, the load distribution control means actuates the front active stabilizer 50 and the rear active stabilizer 60 in the opposite directions (Step S3). As a result, the vertical load on the right rear wheel 10RR increases. It is therefore possible to generate a sufficient lateral force in the right rear wheel 10RR.

3-6. ABS Pressure Increase Acceleration Processing

Figure 12:
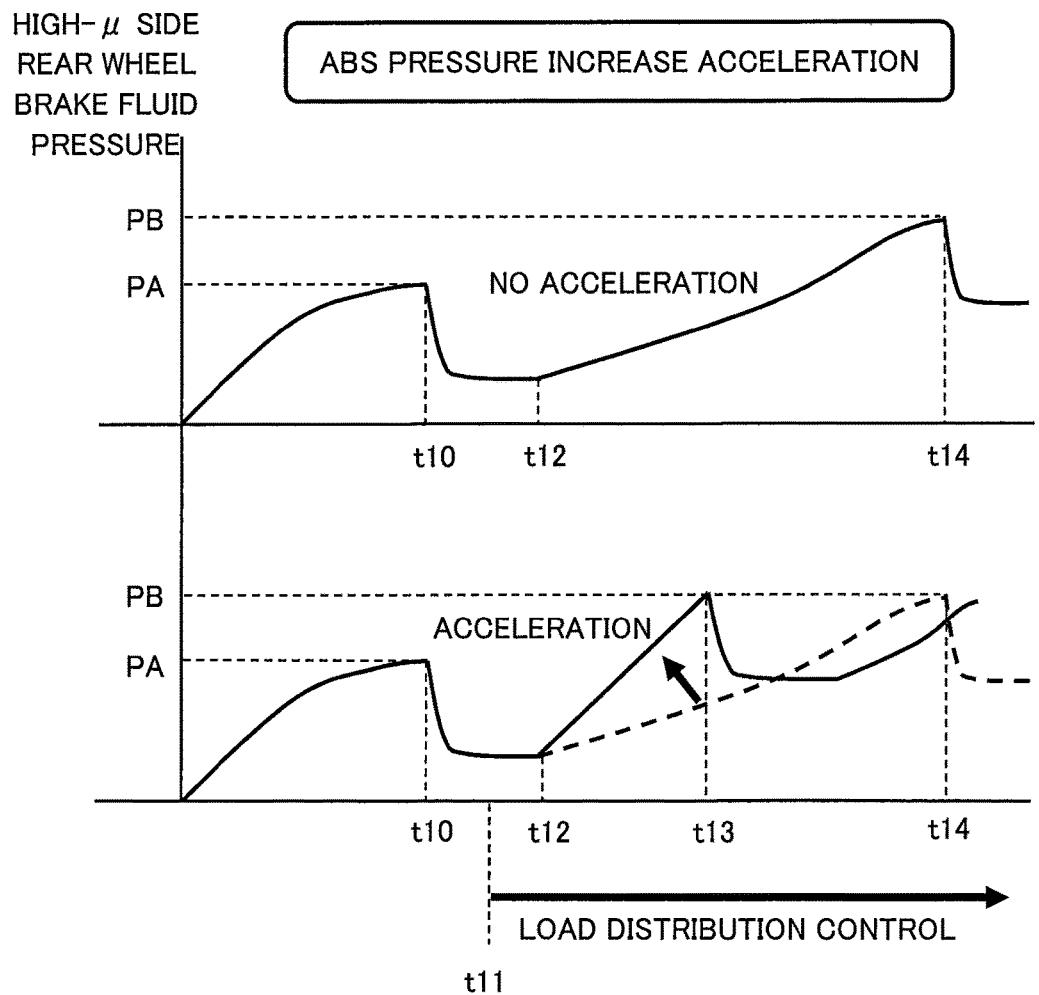
FIG. 12 is a timing chart for explaining ABS pressure increase acceleration processing in the embodiment of the present invention.

When the load distribution control according to the present embodiment is in execution, the braking control means may further perform "ABS pressure increase acceleration processing" as described below. FIG. 12 is a timing chart for explaining the ABS pressure increase acceleration processing. The brake fluid pressure for the right rear wheel 10RR on the high-μ side is shown in FIG. 12.

At a time t10, the right rear wheel 10RR exhibits the locking-up sign, and thus the first anti-lock brake control for the right rear wheel 10RR is started. The brake fluid pressure at the time t10 is "PA". When the anti-lock brake control is started, pressure decrease control is first performed to decrease the brake fluid pressure from PA.

At a time t11 after the time t10, the load distribution control is started.

At a time t12, it is determined that the slip amount of the right rear wheel 10RR has become sufficiently small. After that, pressure increase control that increases (restores) the brake fluid pressure is performed. For example, the pressure increase control is performed by feeding back a difference between the vehicle speed and the wheel speed of the right rear wheel 10RR. As a result, the brake fluid pressure gradually increases.

At a time t14, the right rear wheel 10RR exhibits the locking-up sign again, and thus the second anti-lock brake control for the right rear wheel 10RR is started. The brake fluid pressure at the time t14 is "PB" higher than the previous value "PA". The reason is that the load distribution control is in execution and thus the friction ellipse CRR regarding the right rear wheel 10RR is enlarged.

As described above, the friction ellipse CRR regarding the right rear wheel 10RR is enlarged when the load distribution control is in execution. This means that a margin available for the braking force is increased. In this situation, if the braking force of the right rear wheel 10RR increases slowly, it is not possible to effectively utilize a great opportunity where the large braking force is available. Since it is known that the friction ellipse CRR is enlarged, it is preferable to quickly increase the braking force of the right rear wheel 10RR to enjoy benefits of the large braking force as much as possible.

In view of the above, the braking control means performs the "ABS pressure increase acceleration processing" in order to quickly increase the braking force of the right rear wheel 10RR. More specifically, the braking control means performs the pressure increase control such that the brake fluid pressure increases faster than usual. That is, the braking control means makes a gradient (pressure increase gradient) of the brake fluid pressure in the pressure increase control larger than usual. As a result, as shown in FIG. 12, the brake fluid pressure reaches "PB" at a time t13 earlier than the time t14. Since the great braking force can be obtained at an earlier stage, the deceleration performance improves, which is preferable.

Various methods are considered as a method for making the pressure increase gradient larger. For example, in a case where the pressure increase gradient at a normal time is a predetermined set value, it is possible to make the pressure increase gradient larger by multiplying the predetermined set value by a correction coefficient.

As another example, let us consider a case where the pressure increase control is performed by feeding back a difference between the vehicle speed and the wheel speed of the right rear wheel 10RR. If the difference unexpectedly becomes small at a stage where the brake fluid pressure has not sufficiently recovered yet, the brake fluid pressure does not recover easily. In order to prevent such the situation, a minimum value of the pressure increase gradient is generally set. By increasing the minimum value significantly more than that at a normal time, it is possible to forcibly increase the brake fluid pressure. It should be noted that it is preferable to make the change to the minimum value of the pressure increase gradient only during the period of the first anti-lock brake control. The reason is that if the minimum value of the pressure increase gradient is increased even at and after the second anti-lock brake control, increase and decrease in the brake fluid pressure are frequently repeated in a short period of time, which conversely makes the anti-lock brake control unstable.

The same applies to the left front wheel 10FL where the friction ellipse CFL is enlarged as in the case of the right rear wheel 10RR. Therefore, an acceleration condition for performing the ABS pressure increase acceleration processing is that "the load distribution control is in execution, and the target wheel of the anti-lock brake control is the right rear wheel 10RR or the left front wheel 10FL". The braking control means judges whether or not the acceleration condition is satisfied. When the acceleration condition is satisfied, the braking control means performs the pressure increase control such that the brake fluid pressure for the target wheel increases faster than in a case where the acceleration condition is not satisfied. As a result, the great braking force is obtained at an earlier stage and thus the deceleration performance improves.

4. Summary

According to the present embodiment, as described above, when the difference in braking force between the left and right wheels exceeds the threshold value Th, the load distribution control (see FIGS. 4 and 5) is performed in conjunction with the turning control (see FIG. 2) for the vehicle stabilization. Due to the load distribution control, the vertical load on the right rear wheel 10RR on the high-μ side increases and thus the friction ellipse CRR becomes larger. This means that the lateral force margin of the right rear wheel 10RR on the high-μ side expands. It is therefore possible to generate a sufficient lateral force in the right rear wheel 10RR, even when the deceleration increases. That is to say, it is possible to effectively perform the turning control for the vehicle stabilization, even when the deceleration increases. In other words, it is possible to sufficiently secure both the vehicle stability and the braking performance.

What is claimed is:

1. A vehicle stability control device comprising:
a front active stabilizer installed on a side of a front wheel of a vehicle;
a rear active stabilizer installed on a side of a rear wheel of the vehicle;
a turning device configured to turn the front wheel and the rear wheel; and
a control device configured to perform load distribution control in conjunction with turning control that actuates the turning device, when a difference in braking force between a left side and a right side of the vehicle exceeds a threshold value during braking, wherein
a first side is one of the left side and the right side with a greater braking force, and a second side is another of the left side and the right side,
in the load distribution control, the control device actuates the rear active stabilizer in a direction to lift up the first side and actuates the front active stabilizer in a direction to lift up the second side, and
in the turning control, the control device turns the front wheel and the rear wheel in directions to counteract a yaw moment caused by the difference in the braking force.

2. The vehicle stability control device according to claim 1,
wherein the control device performs the load distribution control such that a roll moment caused by actuation of the rear active stabilizer and a roll moment caused by actuation of the front active stabilizer are balanced.

3. The vehicle stability control device according to claim 1,
wherein the control device is configured to further perform anti-lock brake control that prevents a target wheel from locking up,
wherein the anti-lock brake control includes:
pressure decrease control that decreases a brake fluid pressure for the target wheel; and
pressure increase control that increases the brake fluid pressure after the pressure decrease control, and
wherein when a condition that the load distribution control is in execution and the target wheel is the rear wheel on the first side or the front wheel on the second side is satisfied, the control device performs the pressure increase control such that the brake fluid pressure increases faster than in a case where the condition is not satisfied.

* * * * *